(12) United States Patent
Dung et al.

(10) Patent No.: US 11,359,533 B2
(45) Date of Patent: Jun. 14, 2022

(54) CATALYTIC CONVERTER AND METHOD FOR THE PRODUCTION THEREOF

(71) Applicant: Vitesco Technologies GmbH, Hannover (DE)

(72) Inventors: Sebastian Dung, Schwalbach a. Ts. (DE); Peter Hirth, Schwalbach a. Ts. (DE); Sven Schepers, Schwalbach a. Ts. (DE)

(73) Assignee: Vitesco Technologies GmbH, Hannover (DE)

( * ) Notice: Subject to any disclaimer, the term of this patent is extended or adjusted under 35 U.S.C. 154(b) by 0 days.

(21) Appl. No.: 16/967,202

(22) PCT Filed: Feb. 4, 2019

(86) PCT No.: PCT/EP2019/052674
§ 371 (c)(1),
(2) Date: Aug. 4, 2020

(87) PCT Pub. No.: WO2019/149943
PCT Pub. Date: Aug. 8, 2019

(65) Prior Publication Data
US 2020/0362743 A1     Nov. 19, 2020

(30) Foreign Application Priority Data
Feb. 5, 2018    (DE) ...................... 10 2018 201 738.7

(51) Int. Cl.
*F01N 3/28*       (2006.01)
*B01D 53/94*     (2006.01)

(52) U.S. Cl.
CPC .......... *F01N 3/2814* (2013.01); *B01D 53/94* (2013.01); *F01N 2330/04* (2013.01);
(Continued)

(58) Field of Classification Search
None
See application file for complete search history.

(56) References Cited

U.S. PATENT DOCUMENTS 4,948,774 A *   8/1990   Usui ....................... F01N 3/281
                                                                                       502/439
5,187,142 A *   2/1993   Richmond ............... B01J 35/04
                                                                                       428/593

(Continued)

FOREIGN PATENT DOCUMENTS

CN         102092012       6/2011
DE           2924592       1/1981
(Continued)

OTHER PUBLICATIONS

JPH03-38142(U)-translated claims and drawings description (Year: 1991).*
(Continued)

*Primary Examiner* — Jelitza M Perez
(74) *Attorney, Agent, or Firm* — Cozen O'Connor

(57) ABSTRACT

A catalytic converter for exhaust gas aftertreatment, with a matrix and a casing, the matrix is formed from a coiled layered stack of metal sheets and is inserted into the casing and bonded thereto only in portions and a method for producing a catalytic converter.

14 Claims, 4 Drawing Sheets

(52) U.S. Cl.
CPC ...... *F01N 2330/44* (2013.01); *F01N 2450/22* (2013.01); *F01N 2450/28* (2013.01)

(56) References Cited

U.S. PATENT DOCUMENTS

| | | | | |
|---|---|---|---|---|
| 5,593,646 | A | * | 1/1997 | Koshiba ................. F01N 3/281 422/177 |
| 2007/0033803 | A1 | | 2/2007 | Lawrukovich |

FOREIGN PATENT DOCUMENTS

| | | |
|---|---|---|
| DE | 2954174 | 7/1988 |
| DE | 19803012 | 7/1999 |
| DE | 19823000 | 11/1999 |
| DE | 694 32 719 T2 | 11/2003 |
| DE | 69629196 T2 | 2/2004 |
| DE | 102008016148 | 10/2009 |
| EP | 0049489 | 4/1982 |
| EP | 0658390 | 6/1995 |
| EP | 1557545 | 7/2005 |
| JP | H0338142 | 2/1991 |
| JP | H0338142 U * | 4/1991 |
| KR | 1994-0006760 Y | 9/1994 |
| KR | 0168990 B1 | 1/1999 |
| KR | 10-2014-0133949 | 11/2014 |
| WO | WO 9325339 | 12/1993 |
| WO | WO 9406594 | 3/1994 |
| WO | WO 9634188 | 10/1996 |
| WO | WO-9634188 A1 * | 10/1996 ........... F01N 3/2842 |

OTHER PUBLICATIONS

Office Action dated Nov. 18, 2020 issued in German Patent Application No. 102018201738.7.
Office Action dated Nov. 18, 2021 issued in Korean Patent Application No. 10-2020-7025150.

* cited by examiner

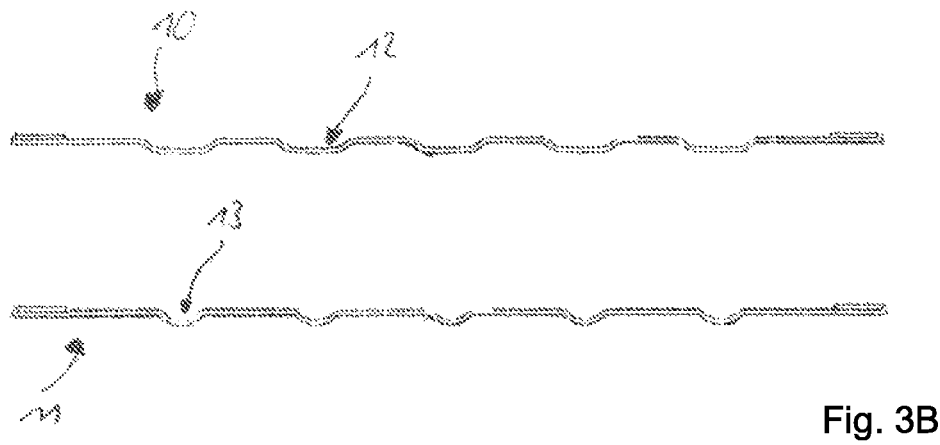
Fig. 3A
Fig. 3B
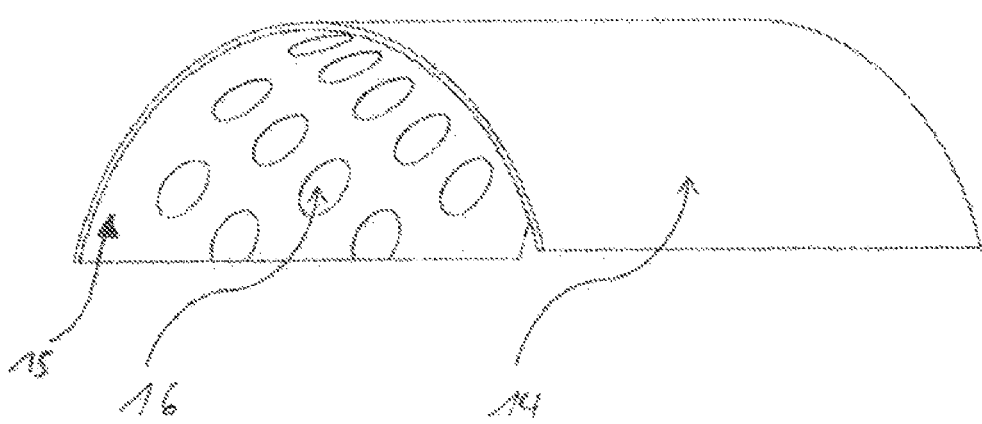
Fig. 4

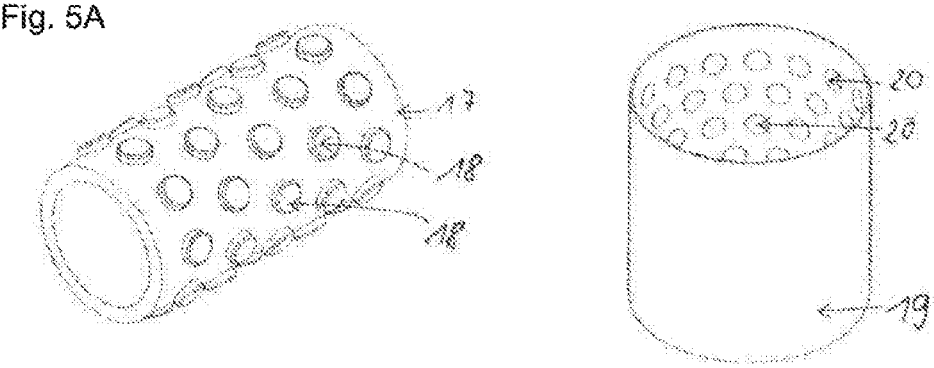
Fig. 5A
Fig. 5B
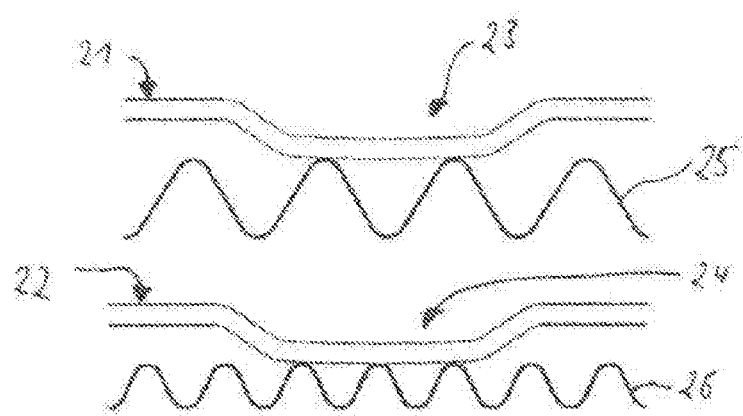
Fig. 6A
Fig. 6B

CATALYTIC CONVERTER AND METHOD FOR THE PRODUCTION THEREOF

CROSS REFERENCE TO RELATED APPLICATIONS

This is a U.S. national stage of Application No. PCT/EP2019/052674 filed Feb. 4, 2019. Priority is claimed on German Application No. DE 10 2018 201 738.7 filed Feb. 5, 2018 the content of which is incorporated herein by reference.

BACKGROUND OF THE INVENTION

1. Field of the Invention

The invention relates to a catalytic converter for exhaust gas aftertreatment, comprising a matrix and a casing, wherein the matrix is formed from a coiled, layered stack of metal sheets and is inserted into the casing and bonded thereto only in portions.

2. Description of Related Art

The prior art discloses catalytic converters for exhaust gas aftertreatment with a metallic matrix inserted in a metallic casing and bonded to the casing by a soldering process. The matrix is usually made from a layered stack formed from alternate flat and structured layers and is coiled to form the actual matrix. This coiled matrix is inserted in the metallic casing and superficially soldered thereto.

The disadvantage of catalytic converters of this type is in particular that the casing and the matrix are connected together over a particularly large area. This is for example due to the fact that by coiling the layered stack, which leads to an offset of the layers on the casing by a few millimeters, alternate flat and corrugated layers bear against the casing, creating a particularly large contact surface.

This is indeed advantageous in principle since a particularly stable connection is achieved. The disadvantage however is that the connection has little flexibility, and this is particularly disadvantageous if it must absorb and compensate for thermally induced differential expansions. This may lead to failure of the layers close to the edge, in particular under stresses from great temperature fluctuations. Furthermore, the method used at present for applying the solder to the casing when the matrix is inserted, also undesirably leads to soldering of regions which should not be bonded to the casing at all.

SUMMARY OF THE INVENTION

It is an object of one aspect of the present invention to create a catalytic converter with a connection between the casing and the matrix, which creates a structured contact point between the casing and the matrix and offers sufficiently great flexibility against thermally induced expansions. It is furthermore an object to provide a method for producing such a catalytic converter.

An exemplary aspect of the invention concerns a catalytic converter for exhaust gas aftertreatment, with a matrix and a casing, wherein the matrix is formed from a coiled, layered stack of metal sheets that is inserted into the casing and bonded thereto only in portions.

The phrase "only in portions" means that the casing is not bonded to the matrix along the entire axial extension and over the entire circumference. In particular, it means that in portions, there are connecting regions that are distributed in the axial direction and/or in the circumferential direction, and that are interrupted by regions in which there is no bonded connection between the casing and the matrix. Such connecting regions and unconnected regions may for example be created by a structured surface of the casing and/or the matrix.

It is particularly advantageous if the casing has protrusions pointing radially inwardly in the axial direction and/or in the circumferential direction, wherein the radially inwardly pointing faces of the protrusions form the contact points between the matrix and the casing.

Protrusions may for example be indentations that are embossed into the casing from the outside. This results in projections on the inner surface of the casing which protrude beyond the rest of the inner face of the casing. Finally, a bonded connection between the casing and the matrix is only created at these projections. The indentations may for example be round, oval, polygonal or have a mixed form. Preferably, the indentations or the projections they create are distributed along the entire axial extension of the casing, and also all around in the circumferential direction, in order to create a connection between the matrix and the casing which is even along the casing.

It is also advantageous if the protrusions have a diameter from 2 mm to 20 mm. The protrusions preferably have a diameter from 2 mm to 20 mm since this creates an adequate contact area for the connection between the casing and the matrix, and at the same time still leaves enough regions that are not directly connected between the matrix and the casing, so as to ensure sufficiently high flexibility against thermally induced stresses.

One aspect of the invention is characterized in that the protrusions have a spacing of 0 mm to 25 mm in the axial direction and/or in the circumferential direction. A pattern with these spacings is advantageous for creating a sufficiently high strength at the connection points and at the same time allowing sufficiently high flexibility.

It is also preferred if the protrusions have a depth from 0.1 mm to 5 mm in the radial direction of the casing. Tests have shown that the depth in the radial direction in the specified region is sufficient to produce a bonded connection only at the actual contact points. If the depth extension in the radial direction is too slight, unintentionally a bonded connection may be created between the casing and the matrix because of solder material outside the contact points.

In addition, it is advantageous if the casing has beads that are spaced apart from each other in the axial direction and run at least partially around in the circumferential direction. The beads may be configured to run almost completely around in the circumferential direction, or alternatively only extend over a part portion in the circumferential direction. Advantageously, the beads extending only over a part portion in the circumferential direction may also be arranged offset to each other in the circumferential direction, and offset from the next adjacent bead in the axial direction. In this way, connection points may be created which are offset from each other both in the circumferential direction and in the axial direction, whereby thermally induced stresses can be better distributed over the casing.

It is also foreseeable that several beads extending only over a part portion in the circumferential direction are arranged spaced apart from each other on one circumferential line. For example, the individual beads may each extend over an arcuate portion of 100° and be arranged spaced apart from each other. Alternatively, more or fewer beads may also be distributed on one circumferential line. The length of the arcuate portion may also be greater or smaller.

It is furthermore advantageous if the radially inwardly pointing faces of the beads form the contact points to the matrix. This is advantageous for ensuring that a connection is created between the matrix and the casing only at the points at which the beads are arranged.

It is also suitable if, on its radially inwardly pointing face, the casing has solder points which are arranged at regular or irregular distances from each other in the axial direction and in the circumferential direction. This is advantageous since spot connections can be created between the casing and the matrix even with an otherwise smooth casing, which in particular has no deformations towards the inside in the radial direction. The solder points preferably create a solder pattern which is distributed completely in the circumferential direction and along the axial extension. The solder points form the later connecting points between the casing and the matrix, while no bonded connection is created between the unsoldered regions of the casing and the matrix. In this way, adequate flexibility can be created between the casing and the matrix.

In addition, it is advantageous if the surface area of a solder point is between 10 mm$^2$ and 700 mm$^2$. It is furthermore suitable if the solder points are circular and have a diameter of between 5 mm and 30 mm, particularly preferably between 7 mm and 20 mm. The size is advantageous for producing a sufficiently strong connection.

It is particularly advantageous if the distance between two solder points in the axial direction of the casing is between 5 mm and 40 mm, particularly preferably between 20 mm and 30 mm. It is furthermore advantageous if the distance between two solder points in the circumferential direction is between 5 mm and 30 mm, particularly preferably between 15 mm and 20 mm. Such a spacing is advantageous for creating a sufficiently tight network of solder points, while at the same time enough unconnected areas are retained to ensure the desired flexibility between casing and matrix.

It is furthermore suitable if the matrix is formed exclusively from corrugated layers. A matrix of exclusively corrugated layers may also ensure that a physical contact exists only between the tips of the corrugations and the casing, and hence a bonded connection is only created there.

One aspect of the invention concerns a method for production of a catalytic converter, wherein the following method steps are performed successively:
production of a matrix by stacking onto each other and coiling several metallic layers,
application of the solder used for soldering to the radially inwardly pointing face of the casing,
insertion of the matrix into the casing, and
soldering of the matrix to the casing,
wherein a gluing roller is used to apply an adhesive to the casing, wherein the gluing roller on its radially outwardly pointing face has elevations via which the gluing roller rolls on the radially inwardly pointing face of the casing, wherein the adhesive is applied to the casing according to the arrangement of the elevations.

The gluing roller is preferably made from cellular rubber and has a suction capacity so that it can absorb an adhesive. The elevations ensure that the gluing roller only rolls on the inner face of the casing in this region, and so—following the principle of potato printing—the adhesive is only applied to the casing at these contact points. The gluing roller thus in practice forms a negative of the solder pattern.

Advantageous developments of the present invention are described in the dependent claims and in the following description of the figures.

BRIEF DESCRIPTION OF THE DRAWINGS

The invention will be explained in detail in the following text on the basis of exemplary embodiments with reference to the drawings, in which:

FIGS. 3A and 3B are cross-sections through casings with beads running in the circumferential direction;

FIG. 4 is a partial view of a casing which has a pattern of solder points on its inner face;

FIG. 5A is a gluing roller for producing a solder point pattern on the inside of the casing FIG. 5B is a casing with a solder point pattern produced by the gluing roller;

FIGS. 6A and 6B are sectional views through two casings with beads running round in the circumferential direction, wherein the indicated matrix is formed from only two corrugated layers;

DETAILED DESCRIPTION OF THE PRESENTLY PREFERRED EMBODIMENTS

Figure 1A:
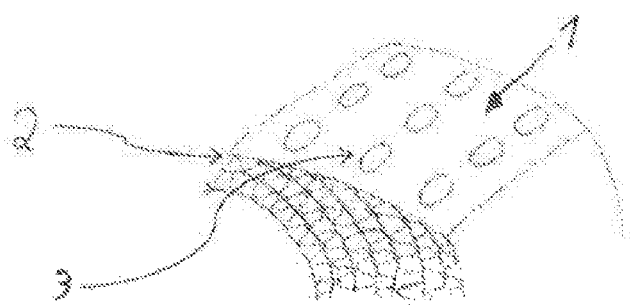
FIG. 1A is a perspective partial view of a matrix in a casing.

FIG. 1A shows a casing 1 in which a matrix 2 is inserted. The casing 1 has a plurality of depressions 3 that form indentations in the casing 1. These indentations 3 may for example be embossed into the casing 1. The matrix 2 is formed by coiling a layered stack formed from alternating smooth and corrugated layers. Alternatively, the matrix may also be formed exclusively from corrugated layers stacked on top of each other with an angle offset to each other. Preferably, the offset angle is between 3° and 10°.

Because of the indentations 3 formed as slots in FIG. 1A, a contact between the outer layers of the matrix and the casing is only formed in regions. Accordingly, on soldering, a bonded connection is created only in these contact regions. As an alternative to the slot-like design shown, the indentations may for example also be configured with circular form or with any other geometric design.

Figure 1B:
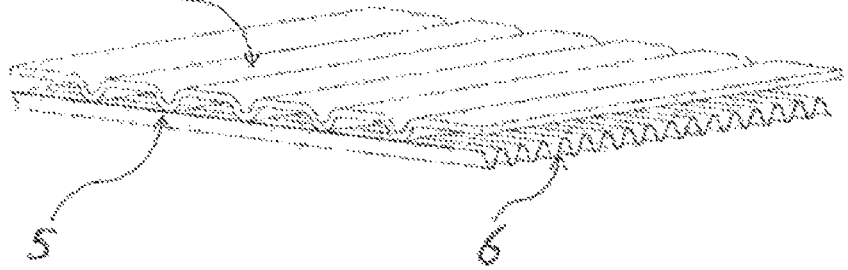
FIG. 1B is a perspective partial view of a matrix in a casing.

In FIG. 1B, a casing 4 is indicated that has slot-like depressions 5. Here too, a contact between the matrix 6 and the casing 4 exists only at the depressions, so that a bonded connection is also only created in these contact regions.

Figure 2:
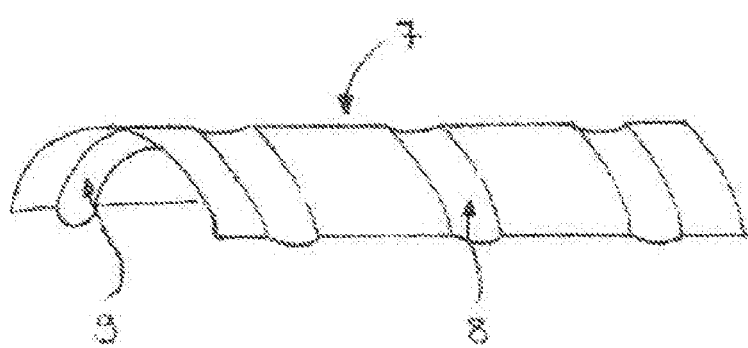
FIG. 2 is a diagrammatic view of a casing with beads running in the circumferential direction.

FIG. 2 shows a part portion of a casing 7 comprising beads 8 that run at least partially round in the circumferential direction and are spaced apart from each other in the axial direction. The beads 8, or the radially inwardly pointing deepest points 9 of the beads 8, form the contact regions of the matrix.

FIGS. 3A and 3B show two cross-sections through different casings 10, 11, wherein the casings 10, 11 each have several beads 12, 13 running round in the circumferential direction and spaced apart from each other in the axial direction. Here again, in each case the radially inwardly pointing faces of the beads 12, 13 form the contact regions which are used for connection to the respective matrix.

FIG. 4 shows a partial view of a casing 14, wherein several solder points 16 are applied in a solder point pattern on the radially inwardly pointing face 15. The solder points here are produced by spot application of an adhesive to the casing and subsequent loading with solder.

A connection can be created between the casing 14 and the matrix during the soldering process only at the points which are loaded with the solder.

FIG. 5A shows a gluing roller 17, which has several elevations 18 distributed over its periphery. This gluing roller is preferably made of a material with a suction capacity, for example a foamed material, and serves for application of an adhesive to the inner face of a casing. The solder point pattern created in the casing can be determined by the shape and arrangement of the elevations 18. The adhesive is transferred to the casing in a fashion similar to a printing process. In a subsequent step, the solder is deposited only at the regions loaded with the adhesive, and later creates the bonded connection in the soldering process.

In FIG. 5B, a casing 19 is depicted in which a solder point pattern 20 is produced by the gluing roller 17 shown In FIG. 5A. The solder point pattern 20 is here produced by rolling of the gluing roller 17 on the inner face of the casing 19.

FIGS. 6A and 6B show sectional views through a casing 21 and 22. The casings 21, 22 each have beads 23, 24 running in the circumferential direction. In the examples of FIGS. 6A and 6B, the indicated matrix 25, 26 is in each case formed solely by corrugated layers, so that at most, the tips of the corrugations of the corrugated layers make contact over the entire extension of the casing 21, 22, whereby sufficiently great flexibility is achieved in the connection between the casing 21, 22 and the matrix. Because of the beads 23, 24, the corrugation tips of the corrugated layers bear on the casing 21, 22 only in the region of the beads 23, 24, whereby the connecting points are further reduced and an even greater flexibility is achieved.

Figure 7:
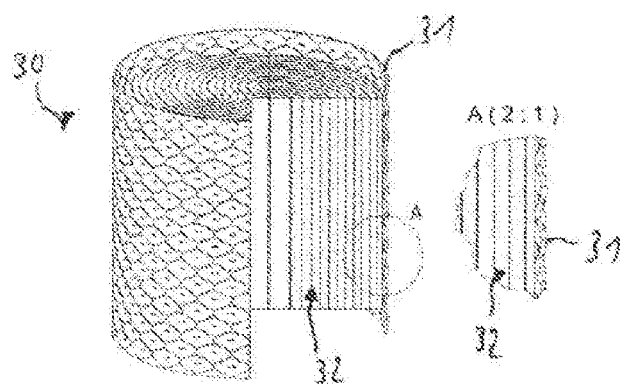
FIG. 7 is a sectional view through a catalytic converter with a diamond-patterned structure which is embossed into the casing.

FIG. 7 shows a sectional view through a catalytic converter 30 according to one aspect of the invention, wherein around one quarter of the catalytic converter 30 is cut away to allow a view of the matrix 32 arranged in the casing 31.

The matrix 32 is formed from several metallic layers stacked on top of each other and coiled to form the finished matrix 32.

The casing 31 has a diamond-patterned structure, which was for example embossed therein from the outside. Because of the diamond-patterned embossing, protruding structures are created on the inner face of the casing 31 which project radially inwardly from the casing 31. These protruding structures serve as contact points between the casing 31 and the matrix 32. In the subsequent soldering process, a bonded connection between the casing 31 and the matrix 32 is only created at these contact points.

The right-hand part of FIG. 7 shows an enlargement of the portion of the catalytic converter 30 designated with reference sign A. In this enlargement, the contact points of the casing 31 bearing on the matrix 32 can be seen.

Figure 8:
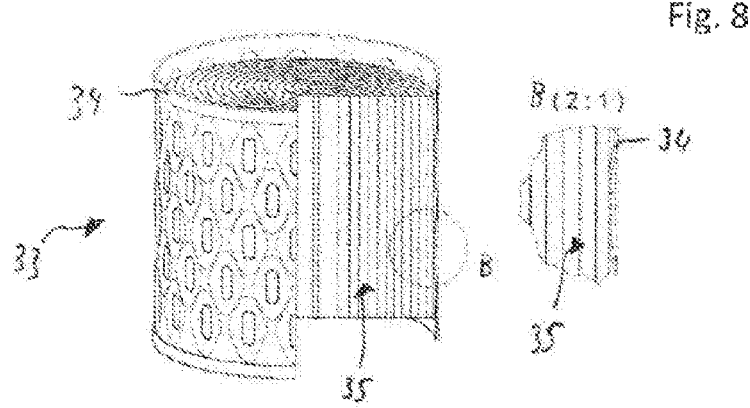
FIG. 8 is a sectional view through a catalytic converter with a diamond-patterned structure which is embossed into the casing.

FIG. 8 shows a catalytic converter 33 with an alternative diamond-patterned embossing. The individual diamonds are larger and have a different orientation from those in FIG. 7. The contact points created by the embossed structure have a larger physical extension, so that the contact area between the casing 34 and the matrix 35 is greater than in the example of FIG. 7. The number of contact points between the casing 34 and the matrix 35 is thus smaller for the same size of catalytic converter.

The right-hand part of FIG. 8 shows an enlarged depiction of the portion marked with reference sign B, showing that the contact points are formed with a larger area and consequently bear on the matrix 35 over a larger area.

Figure 9:
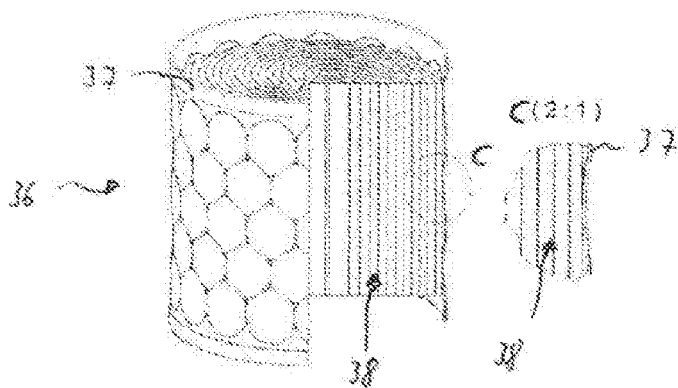
FIG. 9 is a sectional view with a honeycomb-patterned structure which is embossed into the casing.

FIG. 9 shows a further catalytic converter 36 with a casing 37, which has an embossed honeycomb-like structure. The individual hexagons directly adjoin each other and thus also create structures protruding radially inwardly from the casing 37, which serve as contact points to the matrix 38.

As evident in FIGS. 7 to 9, the structure embossed in the casing or created via a different forming process may have various geometric patterns. The essential factor common to all embodiments is that structures are created which protrude radially inwardly and form the contact points to the matrix. The contact area formed by the contact points is here significantly smaller than the entire inner casing surface. This ensures that despite a durable connection, there are enough unconnected regions between the casing and matrix for thermally induced stresses to be able to be absorbed without destruction.

The different features of the individual exemplary embodiments can also be combined with one another. The exemplary embodiments in FIGS. 1 to 9 are in particular not of a limiting nature and serve for illustrating the concept of the invention.

Thus, while there have shown and described and pointed out fundamental novel features of the invention as applied to a preferred embodiment thereof, it will be understood that various omissions and substitutions and changes in the form and details of the devices illustrated, and in their operation, may be made by those skilled in the art without departing from the spirit of the invention. For example, it is expressly intended that all combinations of those elements and/or method steps which perform substantially the same function in substantially the same way to achieve the same results are within the scope of the invention. Moreover, it should be recognized that structures and/or elements and/or method steps shown and/or described in connection with any disclosed form or embodiment of the invention may be incorporated in any other disclosed or described or suggested form or embodiment as a general matter of design choice. It is the intention, therefore, to be limited only as indicated by the scope of the claims appended hereto.

The invention claimed is:

1. A catalytic converter for exhaust gas aftertreatment, comprising:
    a casing having a plurality of individual protrusions directed radially inwardly that are spaced apart from one another in an axial direction and a circumferential direction; and
    a matrix formed from a coiled layered stack of metal sheets, wherein the matrix is inserted into the casing and bonded to the casing only in portions,
    wherein a flow path is created around each of the plurality of individual protrusions, the flow path defined by the casing and a radially outer portion of the matrix.

2. The catalytic converter as claimed in claim 1, wherein radially inwardly pointing faces of the protrusions form contact points between the matrix and the casing.

3. The catalytic converter as claimed in claim 2, wherein the protrusions have an equivalent diameter of 2 mm to 20 mm.

4. The catalytic converter as claimed in claim 2, wherein the protrusions have a spacing of 0 mm to 25 mm in the one of the axial direction and the circumferential direction.

5. The catalytic converter as claimed in claim 2, wherein the protrusions have a depth of 0.1 mm to 5 mm in a radial direction of the casing.

6. The catalytic converter as claimed in claim 1, wherein the casing has beads which are spaced apart from each other in an axial direction and run at least partially round in a circumferential direction.

7. The catalytic converter as claimed in claim 6, wherein radially inwardly pointing faces of the beads form contact points to the matrix.

8. The catalytic converter as claimed in claim 1, wherein on a radially inwardly pointing face of the casing, the casing has solder points arranged at regular or irregular distances from each other in an axial direction and in a circumferential direction.

9. The catalytic converter as claimed in claim 8, wherein a surface area of a respective solder point is between 10 mm$^2$ and 700 mm$^2$.

10. The catalytic converter as claimed in claim 9, wherein the solder points are circular and have a diameter of at least one of between 5 mm and 30 mm and between 7 mm and 20 mm.

11. The catalytic converter as claimed in claim 8, wherein a distance between two solder points in an axial direction of the casing is at least one of between 5 mm and 40 mm and between 20 mm and 30 mm.

12. The catalytic converter as claimed in claim 8, wherein a distance between two solder points in a circumferential direction is at least one of between 5 mm and 30 mm and between 15 mm and 20 mm.

13. The catalytic converter as claimed in claim 1, wherein the matrix is formed exclusively from corrugated layers.

14. A method for production of a catalytic converter, comprising:
   (a) producing a matrix by stacking at least two metallic layers onto each other and coiling the at least two metallic layers;
   (b) applying an adhesive to a casing using a gluing roller and applying solder to a plurality of individual radially inwardly pointing protrusions that are spaced apart from one another in an axial direction and a circumferential direction of the casing;
   (c) inserting the matrix into the casing; and
   (d) soldering the matrix to the casing using the applied solder;
   wherein the gluing roller has elevations on its radially outwardly pointing face via which the gluing roller rolls on the radially inwardly pointing face of the casing,
   wherein the adhesive is applied to the casing according to an arrangement of the elevations,
   wherein a flow path is created around each of the plurality of individual radially inwardly pointing protrusions, the flow path defined by the casing and a radially outer portion of the matrix.

* * * * *